United States Patent
Sun et al.

(10) Patent No.: US 12,234,610 B2
(45) Date of Patent: Feb. 25, 2025

(54) METHOD FOR PREPARING GREEN SLOW-RELEASE PRESERVATIVE PAPER USED FOR FRUIT AND VEGETABLE PRESERVATION

(71) Applicant: Bohai University, Jinzhou (CN)

(72) Inventors: Tong Sun, Jinzhou (CN); Jie Ding, Jinzhou (CN); Yonghong Ge, Jinzhou (CN); Zhaomeng Xu, Jinzhou (CN); Lili Wang, Jinzhou (CN)

(73) Assignee: Bohai University, Jinzhou (CN)

( * ) Notice: Subject to any disclaimer, the term of this patent is extended or adjusted under 35 U.S.C. 154(b) by 847 days.

(21) Appl. No.: 17/464,842

(22) Filed: Sep. 2, 2021

(65) Prior Publication Data
US 2022/0154406 A1    May 19, 2022

(30) Foreign Application Priority Data
Nov. 19, 2020   (CN) .......................... 202011302048.X

(51) Int. Cl.
| | | |
|---|---|---|
| *D21H 25/02* | (2006.01) | |
| *A23B 7/154* | (2006.01) | |
| *A23B 7/16* | (2006.01) | |
| *D21H 17/02* | (2006.01) | |
| *D21H 23/24* | (2006.01) | |
| *D21H 27/00* | (2006.01) | |
| *D21H 27/38* | (2006.01) | |

(52) U.S. Cl.
CPC ............ *D21H 25/02* (2013.01); *A23B 7/154* (2013.01); *A23B 7/16* (2013.01); *D21H 17/02* (2013.01); *D21H 23/24* (2013.01); *D21H 27/004* (2013.01); *D21H 27/38* (2013.01)

(58) Field of Classification Search
CPC ........ D21H 25/02; D21H 17/02; D21H 23/24; D21H 27/004; D21H 27/38; A23B 7/154; A23B 7/16
See application file for complete search history.

(56) References Cited

FOREIGN PATENT DOCUMENTS

| WO | WO-2014085518 A1 * | 6/2014 | ............. A01N 25/22 |
|---|---|---|---|
| WO | WO-2018227944 A1 * | 12/2018 | ............. A23B 7/144 |

* cited by examiner

*Primary Examiner* — Amina S Khan
(74) *Attorney, Agent, or Firm* — McDonnell Boehnen Hulbert & Berghoff LLP

(57) ABSTRACT

The present disclosure discloses a method for preparing a green slow-release preservative paper used for fruit and vegetable preservation. The method includes: step 1, preparing a core paper loaded with biological preservative; step 2, preparing a base membrane loaded with fruit and vegetable respiration inhibitor; and step 3, heating and pressing the core paper loaded with biological preservative and the base membrane loaded with fruit and vegetable respiration inhibitor to obtain the green slow-release preservative paper. The present disclosure uses a biological preservative as a main material and an absorbent paper or a non-woven fabric as an auxiliary material to prepare the green slow-release preservative paper used for fruit and vegetable preservation through a layer-by-layer film covering method.

9 Claims, 3 Drawing Sheets

METHOD FOR PREPARING GREEN SLOW-RELEASE PRESERVATIVE PAPER USED FOR FRUIT AND VEGETABLE PRESERVATION

CROSS REFERENCE TO RELATED APPLICATION(S)

This patent application claims the benefit and priority of Chinese Patent Application No. 202011302048.X, filed on Nov. 19, 2020, the disclosure of which is incorporated by reference herein in its entirety as part of the present application.

TECHNICAL FIELD

The present disclosure relates to the field of application of food preservative materials, and in particular to a method for preparing a green slow-release preservative paper used for fruit and vegetable preservation.

BACKGROUND ART

As an agricultural product producer, China has more than 19,900,000 hectares of vegetable planting area with the annual total yield of 6.9 trillion tons, and more than 2,100,000 hectares of melon and fruit planting area with the annual total yield of 0.8 trillion tons. Fruits are juicy edible plant fruits, mainly having sweet taste and sour taste. They not only contain rich vitamin nutrition, but also could promote digestion. Fruits mainly include stone fruits, kernel fruits and berries, and vegetables mainly include rhizomatic vegetables, melons, solanaceous vegetables, leaf vegetables, flower vegetables and legumes, the physiological activities of which are significantly different after harvest. In recent years, the yield of fruits and vegetables in China keeps increasing, and the requirements of domestic market could be met. Moreover, many varieties of fruits and vegetables are exported to all over the world.

Fruits and vegetables are fresh food, being prone to rot after harvest. Due to a short preservation period, many varieties of fruits and vegetables only could be sold locally, which seriously restricts the storage and transportation of products, thereby the economic benefits are affected. In addition, a large amount of fruits are rotten and become agricultural product wastes, causing the environment pollution. The rotting of fruits and vegetables in China is very serious, and the rotting loss rate of the fruits and vegetables reaches 25%-30%, which is much higher than that of the developed countries, such as Europe and America. Therefore, a proper preservation technology is urgently needed. In order to prolong the preservation period of fruits and vegetables, various preservation technologies, mainly including physical preservation methods, chemical preservation methods and biological preservation methods, have been applied to practice.

SUMMARY

Based on the above technical background, the present disclosure provides a method for preparing a green slow-release preservative paper used for fruit and vegetable preservation. An object is to prepare a green slow-release preservative paper, which may be used for fruit and vegetable preservation and has long-acting preservative performance. The product uses a biological preservative as a main material, and constructs a slow-release system by means of multi-layered film covering.

The present disclosure provides the following technical solutions.

A method for preparing a green slow-release preservative paper used for fruit and vegetable preservation, comprising:

step 1: preparing a core paper loaded with biological preservative: preparing an aqueous solution or ethanol solution of a biological preservative with a concentration, soaking an absorbent paper in the solution, taking out the absorbent paper after complete impregnation, and drying or airing at normal temperature, to obtain the core paper loaded with biological preservative;

step 2: preparing a base membrane loaded with fruit and vegetable respiration inhibitor: taking an amount of β-cyclodextrin-embedded 1-methylcyclopropene as a fruit and vegetable respiration inhibitor, and uniformly loading on a surface of an absorbent paper coated with an adhesive, to obtain the base membrane loaded with fruit and vegetable respiration inhibitor; and step 3: preparing the green slow-release preservative paper: applying an adhesive on both sides of the core paper loaded with biological preservative, placing the base membrane loaded with fruit and vegetable respiration inhibitor with the same area on one side, placing an air-permeable paper with the same area on the other side, then heating and pressing to obtain the green slow-release preservative paper being able to be used for fruit and vegetable preservation, and sealing and storing the green slow-release preservative paper.

In some embodiments, in step 1, an additive amount of the biological preservative in total is in a range of 5-5000 $mg/m^2$.

In some embodiments, an additive amount of β-cyclodextrin-embedded 1-methylcyclopropene is in a range of 5-500 $mg/m^2$.

In some embodiments, in step 3, the adhesive is an adhesive used for food packaging materials.

In some embodiments, the pressing is performed at a temperature from room temperature to 100° C.

In some embodiments, in step 1 and step 2, the absorbent paper is alternatively replaced with a non-woven fabric with water absorptivity, and in step 3, the air-permeable paper is alternatively replaced with a non-woven fabric.

In some embodiments, the biological preservative is selected from the group consisting of a plant source preservative, an animal source preservative and a microorganism source preservative, and includes one or more selected from the group consisting of tea polyphenol, phytic acid, cinnamaldehyde, carvacrol, origanum vulgare essential oil, laurel essential oil, propolis crude extract, litsea cubeba volatile oil, lemon essential oil, thymol, star anise oil, clove leaf oil, rosemary, ascorbic acid, chitosan, protamine, lysozyme, natamycin, ε-polylysine hydrochloride and nisin.

The present disclosure has the following advantages and beneficial effects:

(1) The method provided in the present disclosure is easy to operate, has low requirements for production apparatus, is easy to control operating conditions, and has low operation cost;

(2) The present disclosure could provide a technical method for solving the problems such as the short preservative period of fruits and vegetables during a normal-temperature transportation and a cold-chain transportation; and (3) The present disclosure constructs a slow-release system of biological preservative through a multi-layered film covering method, wherein the method is simple, and the biological preservative has a long-acting effect.

In order to improve the storage quality of fruits and vegetables, prolong the preservative period, broaden the sales scope and promote economic benefits, a green slow-release preservative paper used for fruit and vegetable preservation is prepared in the disclosure by using a biological preservative as a main material and an absorbent paper or a non-woven fabric as an auxiliary material though a layer-by-layer film covering method. In the present disclosure, the layer-by-layer film covering of the absorbent paper or the non-woven fabric is performed by heating and pressing adhesion technology, which is easy to realize industrialization, has a simple production process, and has stable physicochemical properties of products. The product prepared in the present disclosure uses the biological preservative as the main material, all of which are gradually released and decomposed during use, having high security without causing toxicity and harm. In the present disclosure, the carrier of the biological preservative is an absorbent paper or a non-woven fabric. Moreover, the slow-release system of the biological preservative is constructed by means of the multi-layered film covering structure of the preservative paper, which makes the preservative release slowly, prolonging the effective action time. In short, the product prepared in the present disclosure is safe, efficient and long-acting, having a desirable application prospect.

DETAILED DESCRIPTION OF THE EMBODIMENTS

Figure 1:
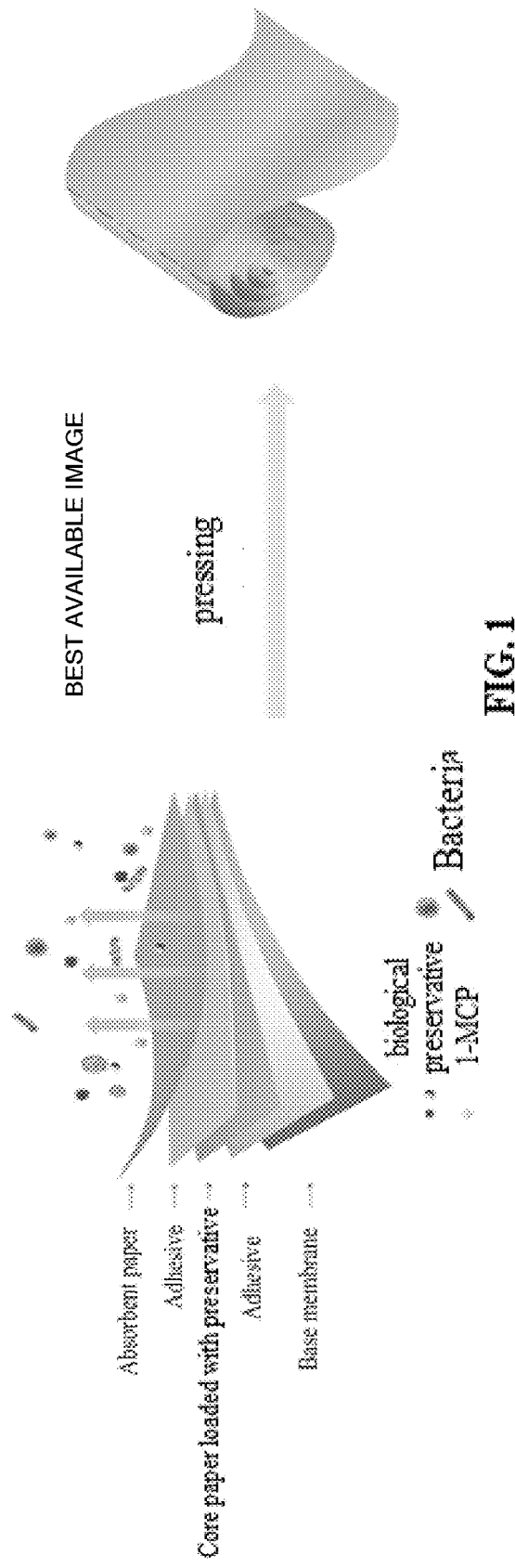
FIG. 1 shows a schematic diagram of the composition of a green slow-release preservative paper used for fruit and vegetable preservation.
Figure 2:
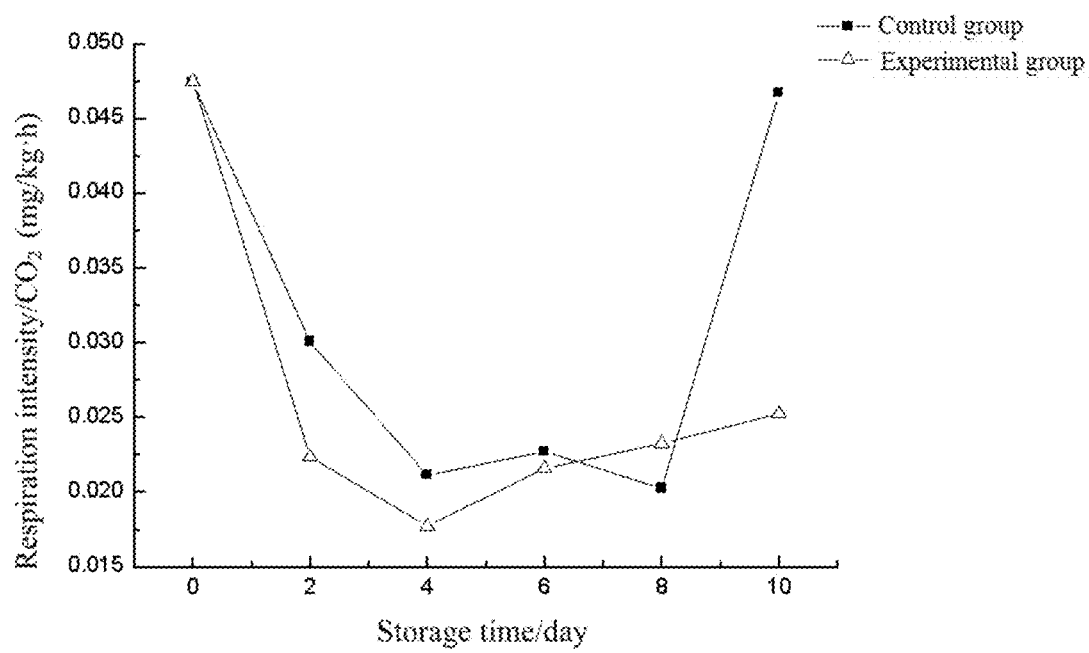
FIG. 2 is a graph showing a respiration curve of the plums during preservation in Example 1.
Figure 3:
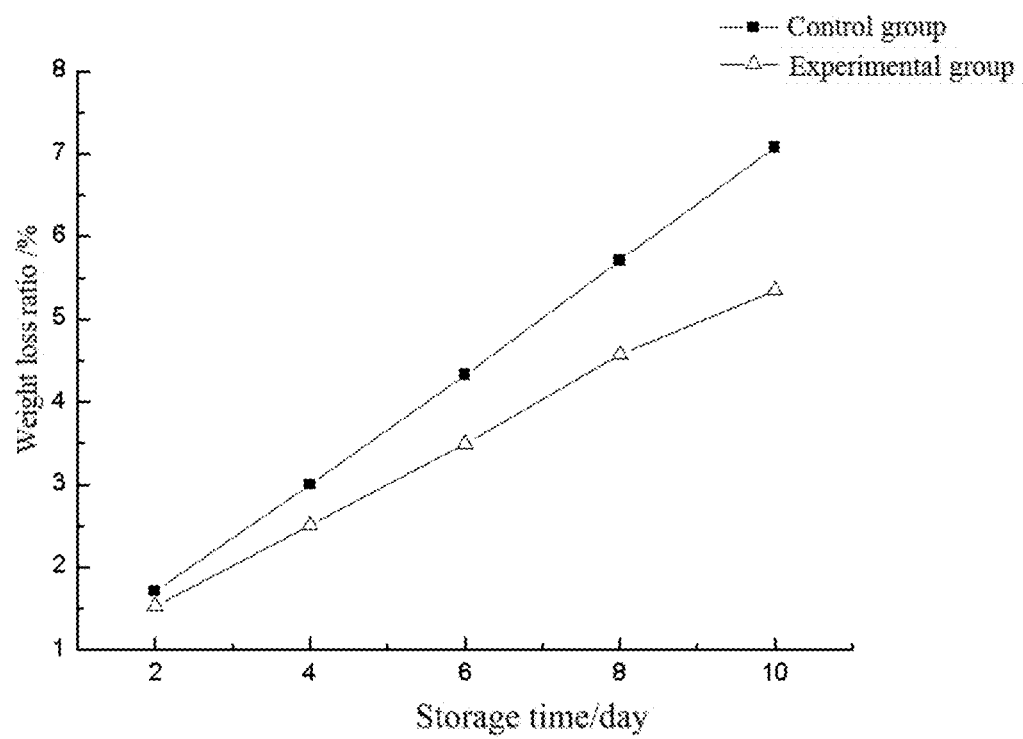
FIG. 3 is a graph showing a weight loss curve of the plums during preservation in Example 2.
Figure 4:
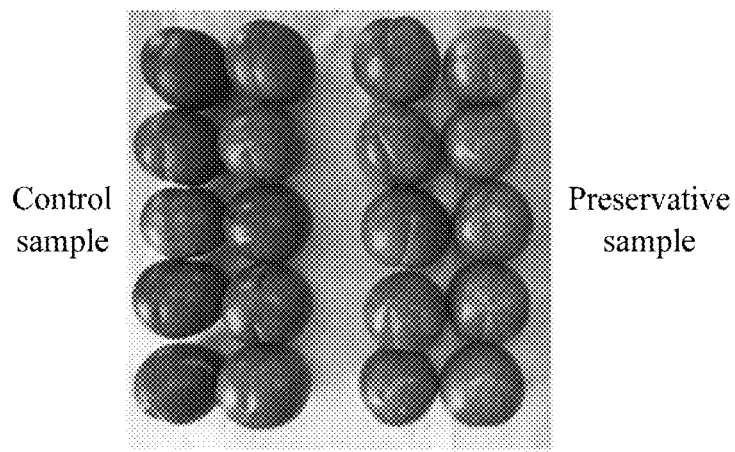
FIG. 4 is a picture showing the comparison of the plums after preservation for 12 days in Example 3.
Figure 5:
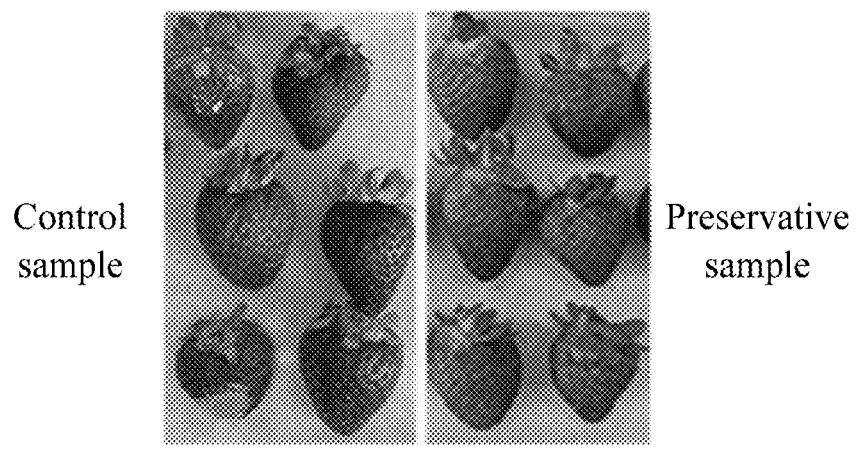
FIG. 5 is a picture showing the comparison of the strawberries after preservation for 8 days in Example 5.
Figure 6:
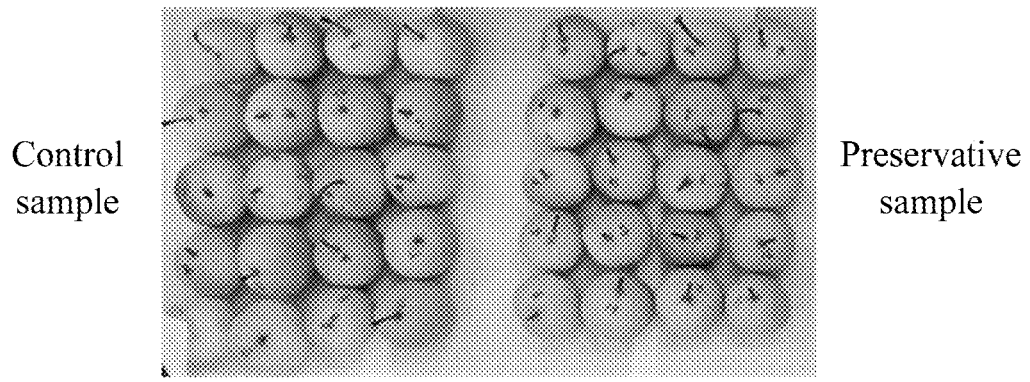
FIG. 6 is a picture showing the comparison of the Nanguo pears after preservation for 9 days in Example 6.

The present disclosure will be further illustrated below with reference to embodiments.

The present disclosure provides a method for preparing a green slow-release preservative paper used for fruit and vegetable preservation. The method comprises steps as follows.

Step 1: a core paper loaded with biological preservative is prepared. One or more biological preservatives are taken, including but not limited to those as recited aforementioned. An aqueous solution or ethanol solution of the biological preservative with a certain concentration is prepared. An absorbent paper is soaked in the solution, and then taken out after completely impregnation, wherein an additive amount of the biological preservative in total is in a range of 5-5000 mg/m$^2$. The impregnated absorbent paper is dried or aired, to obtain the core paper loaded with biological preservative, wherein the drying or airing is performed at a temperature from normal temperature to 100° C. The absorbent paper may be replaced with a non-woven fabric with water absorptivity.

Step 2: a base membrane loaded with fruit and vegetable respiration inhibitor is prepared. 5-500 mg of β-cyclodextrin-embedded 1-MCP (1-methylcyclopropene) is uniformly loaded on a surface of 1 m$^2$ of an absorbent paper coated with an adhesive, to obtain the base membrane loaded with fruit and vegetable respiration inhibitor. The absorbent paper may be replaced with a non-woven fabric with water absorptivity.

Step 3: the green slow-release preservative paper is prepared. An adhesive used for food packaging materials is applied on both sides of the core paper loaded with biological preservative, the base membrane loaded with fruit and vegetable respiration inhibitor with the same area is placed on one side, and an air-permeable paper with the same area is placed on the other side. After being pressed at a temperature from room temperature to 100° C., the green slow-release preservative paper being able to be used for fruit and vegetable preservation is obtained. The green slow-release preservative paper is sealed and stored. Subsequently, the preservative paper covers on the surface of the fruits and vegetables or is placed under the fruits and vegetables for preserving the fruits and vegetables. The air-permeable paper may be replaced with an air-permeable non-woven fabric.

Example 1

A method for preparing a green slow-release preservative paper used for fruit and vegetable preservation was performed by the following steps:

(1) Preparation of a core paper loaded with biological preservative 2,000 mg of tea polyphenol was taken and formulated into a 40 mL aqueous solution, and 1 m$^2$ of an absorbent paper was soaked therein. The impregnated absorbent paper was taken out and dried at 50° C., obtaining the core paper loaded with biological preservative.

(2) Preparation of a base membrane loaded with fruit and vegetable respiration inhibitor 200 mg of β-cyclodextrin-embedded 1-MCP (1-methylcyclopropene) was uniformly loaded on a surface of 1 m$^2$ of an absorbent paper coated with an adhesive, obtaining the base membrane loaded with fruit and vegetable respiration inhibitor.

(3) Preparation of the green slow-release preservative paper

An adhesive used for food packaging materials was applied on both sides of the core paper loaded with biological preservative. The base membrane loaded with fruit and vegetable respiration inhibitor with the same area was placed on one side. An air-permeable paper with the same area was placed on the other side. The resultant was heated to 60° C. and pressed, obtaining the green slow-release preservative paper being able to be used for fruit and vegetable preservation. The green slow-release preservative paper was sealed and stored. Plums were covered with the prepared green slow-release preservative paper and stored at normal temperature.

Example 2

A method for preparing a green slow-release preservative paper used for fruit and vegetable preservation was performed by the following steps:

(1) Preparation of a core paper loaded with biological preservative 35 mg of phytic acid and 65 mg of cinnamaldehyde were taken and formulated into a 40 mL aqueous solution, and 1 m² of an absorbent paper was soaked therein. The impregnated absorbent paper was taken out and dried at 40° C., obtaining the core paper loaded with biological preservative.

(2) Preparation of a base membrane loaded with fruit and vegetable respiration inhibitor 100 mg of β-cyclodextrin-embedded 1-MCP (1-methylcyclopropene) was uniformly loaded on a surface of 1 m² of an absorbent paper coated with an adhesive, obtaining the base membrane loaded with fruit and vegetable respiration inhibitor.

(3) Preparation of the green slow-release preservative paper

An adhesive used for food packaging materials was applied on both sides of the core paper loaded with biological preservative. The base membrane loaded with fruit and vegetable respiration inhibitor with the same area was placed on one side. An air-permeable paper with the same area was placed on the other side. The resultant was heated to 45° C. and pressed, obtaining the green slow-release preservative paper being able to be used for fruit and vegetable preservation. The green slow-release preservative paper was sealed and stored. Plums were covered with the prepared green slow-release preservative paper and stored at normal temperature.

Example 3

A method for preparing a green slow-release preservative paper used for fruit and vegetable preservation was performed by the following steps:

(1) Preparation of a core paper loaded with biological preservative 80 mg of lysozyme, 50 mg of ε-polylysine hydrochloride and 270 mg of ascorbic acid were taken and formulated into a 40 mL aqueous solution, and 1 m² of an absorbent paper was soaked therein. The impregnated absorbent paper was taken out and dried at 70° C., obtaining the core paper loaded with biological preservative.

(2) Preparation of a base membrane loaded with fruit and vegetable respiration inhibitor 400 mg of β-cyclodextrin-embedded 1-MCP (1-methylcyclopropene) was uniformly loaded on a surface of 1 m² of an absorbent paper coated with an adhesive, obtaining the base membrane loaded with fruit and vegetable respiration inhibitor.

(3) Preparation of the green slow-release preservative paper

An adhesive used for food packaging materials was applied on both sides of the core paper loaded with biological preservative. The base membrane loaded with fruit and vegetable respiration inhibitor with the same area was placed on one side. An air-permeable paper with the same area was placed on the other side. The resultant was heated to 80° C. and pressed, obtaining the green slow-release preservative paper being able to be used for fruit and vegetable preservation. The green slow-release preservative paper was sealed and stored. Plums were covered with the prepared green slow-release preservative paper and stored at normal temperature.

Example 4

A method for preparing a green slow-release preservative paper used for fruit and vegetable preservation was performed by the following steps:

(1) Preparation of a core paper loaded with biological preservative 580 mg of origanum vulgare essential oil and 1200 mg of laurel essential oil were taken and formulated into a 40 mL aqueous solution, and 1 m² of an absorbent paper was soaked therein. The impregnated absorbent paper was taken out and dried at 60° C., obtaining the core paper loaded with biological preservative.

(2) Preparation of a base membrane loaded with fruit and vegetable respiration inhibitor 300 mg of β-cyclodextrin-embedded 1-MCP (1-methylcyclopropene) was uniformly loaded on a surface of 1 m² of an absorbent paper coated with an adhesive, obtaining the base membrane loaded with fruit and vegetable respiration inhibitor.

(3) Preparation of the green slow-release preservative paper

An adhesive used for food packaging materials was applied on both sides of the core paper loaded with biological preservative. The base membrane loaded with fruit and vegetable respiration inhibitor with the same area was placed on one side. An air-permeable paper with the same area was placed on the other side. The resultant was heated to 75° C. and pressed, obtaining the green slow-release preservative paper being able to be used for fruit and vegetable preservation. The green slow-release preservative paper was sealed and stored. Plums were covered with the prepared green slow-release preservative paper and stored at normal temperature.

Example 5

A method for preparing a green slow-release preservative paper used for fruit and vegetable preservation was performed by the following steps:

(1) Preparation of a core paper loaded with biological preservative 2500 mg of thymol, 1800 mg of lemon essential oil and 700 mg of natamycin were taken and formulated into a 40 mL aqueous solution, and 1 m² of an absorbent paper was soaked therein. The impregnated absorbent paper was taken out and dried at 100° C., obtaining the core paper loaded with biological preservative.

(2) Preparation of a base membrane loaded with fruit and vegetable respiration inhibitor 5 mg of β-cyclodextrin-embedded 1-MCP (1-methylcyclopropene) was uniformly loaded on a surface of 1 m² of an absorbent paper coated with an adhesive, obtaining the base membrane loaded with fruit and vegetable respiration inhibitor.

(3) Preparation of the green slow-release preservative paper

An adhesive used for food packaging materials was applied on both sides of the core paper loaded with biological preservative. The base membrane loaded with fruit and vegetable respiration inhibitor with the same area was placed on one side. An air-permeable paper with the same area was placed on the other side. The resultant was heated to 100° C. and pressed, obtaining the green slow-release preservative paper being able to be used for fruit and vegetable preservation. The green slow-release preservative paper was sealed and stored. Strawberries were covered with the prepared green slow-release preservative paper and stored at normal temperature.

Example 6

A method for preparing a green slow-release preservative paper used for fruit and vegetable preservation was performed by the following steps:

(1) Preparation of a core paper loaded with biological preservative 450 mg of carvacrol, 350 mg of star anise oil and 100 mg of protamine were taken and formulated into a 40 mL aqueous solution, and 1 m² of an absorbent paper was soaked therein. The impregnated absorbent paper was taken out and dried at 55° C., obtaining the core paper loaded with biological preservative.

(2) Preparation of a base membrane loaded with fruit and vegetable respiration inhibitor 50 mg of β-cyclodextrin-embedded 1-MCP (1-methylcyclopropene) was uniformly loaded on a surface of 1 m² of an absorbent paper coated with an adhesive, obtaining the base membrane loaded with fruit and vegetable respiration inhibitor.

(3) Preparation of the green slow-release preservative paper

An adhesive used for food packaging materials was applied on both sides of the core paper loaded with biological preservative. The base membrane loaded with fruit and vegetable respiration inhibitor with the same area was placed on one side. An air-permeable paper with the same area was placed on the other side. The resultant was heated to 65° C. and pressed, obtaining the green slow-release preservative paper being able to be used for fruit and vegetable preservation. The green slow-release preservative paper was sealed and stored. Nanguo pears were covered with the prepared green slow-release preservative paper and stored at normal temperature.

Example 7

A method for preparing a green slow-release preservative paper used for fruit and vegetable preservation was performed by the following steps:

(1) Preparation of a core paper loaded with biological preservative 5 mg of rosemary was taken and formulated into a 40 mL aqueous solution, and 1 m² of an absorbent paper was soaked therein. The impregnated absorbent paper was taken out and aired at normal temperature, obtaining the core paper loaded with biological preservative.

(2) Preparation of a base membrane loaded with fruit and vegetable respiration inhibitor 500 mg of β-cyclodextrin-embedded 1-MCP (1-methylcyclopropene) was uniformly loaded on a surface of 1 m² of an absorbent paper coated with an adhesive, obtaining the base membrane loaded with fruit and vegetable respiration inhibitor.

(3) Preparation of the green slow-release preservative paper

An adhesive used for food packaging materials was applied on both sides of the core paper loaded with biological preservative. The base membrane loaded with fruit and vegetable respiration inhibitor with the same area was placed on one side. An air-permeable paper with the same area was placed on the other side. The resultant was pressed at normal temperature, obtaining the green slow-release preservative paper being able to be used for fruit and vegetable preservation. The green slow-release preservative paper was sealed and stored. Nanguo pears were covered with the prepared green slow-release preservative paper and stored at normal temperature.

What is claimed is:

1. A method for preparing a green slow-release preservative paper used for fruit and vegetable preservation, comprising:
   step 1: preparing an aqueous solution or ethanol solution of a biological preservative with a concentration, soaking an absorbent paper in the solution, taking out the absorbent paper after complete impregnation, and drying or airing at room temperature, to obtain a core paper loaded with biological preservative;
   step 2: taking an amount of β-cyclodextrin-embedded 1-methylcyclopropene as a fruit and vegetable respiration inhibitor, and uniformly loading on a surface of an absorbent paper coated with an adhesive, to obtain a base membrane loaded with fruit and vegetable respiration inhibitor; and
   step 3: applying an adhesive on both sides of the core paper loaded with biological preservative, placing the base membrane loaded with fruit and vegetable respiration inhibitor with the same area on one side, placing an air-permeable paper with the same area on the other side, and then heating and pressing to obtain the green slow-release preservative paper.

2. The method of claim 1, wherein in step 1, an additive amount of the biological preservative in total is in a range of 5-5000 mg/m2.

3. The method of claim 1, wherein an additive amount of β-cyclodextrin-embedded 1-methylcyclopropene is in a range of 5-500 mg/m2.

4. The method of claim 1, wherein in step 3, the adhesive is an adhesive used for food packaging materials.

5. The method of claim 1, wherein the pressing is performed at a temperature from room temperature to 100° C.

6. The method of claim 1, wherein the biological preservative is selected from the group consisting of a plant source preservative, an animal source preservative and a microorganism source preservative.

7. The method of claim 2, wherein the biological preservative is selected from the group consisting of a plant source preservative, an animal source preservative and a microorganism source preservative.

8. The method of claim 6, wherein the biological preservative includes one or more selected from the group consisting of tea polyphenol, phytic acid, cinnamaldehyde, carvacrol, origanum vulgare essential oil, laurel essential oil, propolis crude extract, litsea cubeba volatile oil, lemon essential oil, thymol, star anise oil, clove leaf oil, rosemary, ascorbic acid, chitosan, protamine, lysozyme, natamycin, ε-polylysine hydrochloride and nisin.

9. The method of claim 7, wherein the biological preservative includes one or more selected from the group consisting of tea polyphenol, phytic acid, cinnamaldehyde, carvacrol, origanum vulgare essential oil, laurel essential oil, propolis crude extract, litsea cubeba volatile oil, lemon essential oil, thymol, star anise oil, clove leaf oil, rosemary, ascorbic acid, chitosan, protamine, lysozyme, natamycin, ε-polylysine hydrochloride and nisin.

* * * * *